United States Patent [19]
Tomatsu et al.

[11] Patent Number: 5,932,992
[45] Date of Patent: Aug. 3, 1999

[54] METHOD FOR ENERGIZING ENERGIZATION-OPERATED TOY ELEMENT AND ENERGIZATION-OPERATED TOY

[75] Inventors: Tsutomu Tomatsu, Nagoya; Kyoji Aoyama, Aichi-ken; Naomasa Miyashita, Nagoya; Nobuaki Matsunami, Kagamihara; Tsutomu Kito, Tajimi, all of Japan

[73] Assignee: The Pilot Ink Co., Ltd., Japan

[21] Appl. No.: 09/102,056

[22] Filed: Jun. 22, 1998

Related U.S. Application Data

[62] Division of application No. 08/602,445, Feb. 16, 1996, abandoned.

[51] Int. Cl.⁶ .................................................. H02J 7/00
[52] U.S. Cl. ........................ 320/167; 320/103; 320/166
[58] Field of Search .................................. 320/103, 166, 320/167

[56] References Cited

U.S. PATENT DOCUMENTS

| | | | |
|---|---|---|---|
| 3,594,627 | 7/1971 | Lescher | 320/103 |
| 3,629,680 | 12/1971 | Baynes et al. | 320/103 |
| 4,563,626 | 1/1986 | Ohtake | 320/103 |
| 4,692,680 | 9/1987 | Sherer | 320/103 |
| 5,119,010 | 6/1992 | Shirata et al. | 320/166 |
| 5,316,513 | 5/1994 | Nakagawa et al. | 446/14 |
| 5,407,444 | 4/1995 | Kroll | 320/107 |
| 5,498,951 | 3/1996 | Okamura et al. | 320/166 |
| 5,528,121 | 6/1996 | Okamura | 320/167 |

FOREIGN PATENT DOCUMENTS

| | | |
|---|---|---|
| 0473446 | 3/1992 | European Pat. Off. |
| 07308461 | 11/1995 | Japan |

*Primary Examiner*—Peter S. Wong
*Assistant Examiner*—K. Shin
*Attorney, Agent, or Firm*—Fitzpatrick, Cella, Harper & Scinto

[57] ABSTRACT

A method for energizing an energization-operated toy element in which an electric double layer capacitor is employed as energization means for energizing a toy element which is operated upon application of low voltage, the capacitor is charged upon reception of a current from a DC power source, and the charged electric power is used to energize a toy load as a discharge current to operate the toy element. An energization-operated toy which comprises an energization heating color changing element provided with an energization resistant heating member for generating heat upon application of the DC voltage and a thermal color changing layer disposed in contact with or close to the heating member, energization means consisting of an electric double layer capacitor for generating heat by supplying the discharge current to the energization resistant heating member, and a power source for supplying the DC voltage from 0.5 V to 9.0 V to the capacitor.

1 Claim, 13 Drawing Sheets

METHOD FOR ENERGIZING ENERGIZATION-OPERATED TOY ELEMENT AND ENERGIZATION-OPERATED TOY

This is a division of application Ser. No. 08/602,445, filed Feb. 16, 1996.

BACKGROUND OF THE INVENTION

1. Field of the Invention

The present invention relates to a method for electrically energizing an energization-operated toy element and an energization-operated toy. More particularly, the present invention relates to an energizing method which employs an electric double layer capacitor as energization means for electrically energizing a toy element which is operated upon application of low voltage and an energization-operated toy which uses said method.

2. Related Background Art

Hitherto, application of voltage directly from a battery or an AC adapter was mainly employed for electrically energizing an energization toy load. Therefore, in an energization heat generation color changing toy, for example, a resistant heating member such as Nichrome wire or a conductive circuit was apt to be overheated. Thus, a sensor, a switch or the like for preventing this was inevitable. As a result, electrically energization means which can be employed easily without troubles including the above-mentioned overheating was required.

SUMMARY OF THE INVENTION

An object of the present invention is to provide an energizing method as well as an energization-operated toy, which utilizes a discharge current of an electric double layer capacitor as energization means for electrically energizing a toy element which is operated upon application of low voltage, and in particular, as energization means for electrically energizing a resistant heating member in an energization heat generation color changing toy element, so as to supply a required electric current smoothly, and which can be operated safely without troubles due to an overheating or a short circuit.

According to the present invention, there are provided a method for electrically energizing an energization-operated toy element and an energizing operation toy which are characterized in that an electric double layer capacitor 31 is employed as energization means for electrically energizing a toy element which is operated upon application of low voltage, the capacitor is charged upon reception of a current from a DC power source, and the charged electric power is used to electrically energize a toy load as a discharge current to operate the toy element. Further, there is provided an energization heat generation color changing toy which comprises: an energization heat generation color changing element provided with a resistant heating member for generating heat upon application of DC voltage and a thermal color changing layer disposed in contact with or close to said heating member, energization means 3 consisting of the electric double layer capacitor for supplying a discharge current to the resistant heating member to generate heat; and a power source for charging said capacitor by supplying DC voltage from 0.5 V to 9.0 V to the capacitor. There is further provided a method for electrically energizing an energization-operated toy element which is characterized in that the electric double layer capacitor is interposed in the route to the power source as the energization means for electrically energizing the toy load which is operated upon application of low voltage and said electric double layer capacitor is charged upon reception of a DC current from the power source to send a discharge current to energize and operate the toy load. Further there is provided an energization-operated toy which comprises the toy load to be operated upon application of DC low voltage, the power source, the electric double layer capacitor to be charged upon reception of a direct current from said power source for supplying a discharge current to said toy load, and a switch 5, and which is arranged such that said charging and discharging operations are effected, linking with a switching on/off operation of said energization switch so as to make said toy load operable at the time of discharging operation.

As the above-mentioned electric double layer capacitor, a known capacitor can be used. Such capacitor is arranged to comprise a mixed system of activated charcoal and electrolyte (solution of dilute sulfuric acid) in a basic cell thereof, and insulating porous separator is interposed for preventing a short circuit which may be caused by contact between the activated charcoals. When the above-mentioned two different phases of solid and liquid are brought into contact, positive and negative electric charges are distributed with very short distances therebetween at an interface of said two phases. When voltage is applied to said capacitor from an external unit, the capacitor operates to store a further larger charge in a short time. As a result, such capacitor functions effectively as means for energizing a toy element which is operated upon application of low voltage according to the present invention. As such capacitor, Gold Capacitor AL series (trade name) made by Matsushita Electric Parts Co., Ltd., (having a cylindrical form, voltage-proof against 2.5 V per cell, capacity of 0.22 F (outer diameter: $\phi 6.8 \times L21$ mm) to 100 F (outer diameter: $\phi 18 \times L35$ mm) are available on the market.

The above-mentioned electric double layer capacitor performs a function of a storage battery, has a larger electric capacity than a normal capacitor, and is capable of instant discharge of a large current. Since the capacitor divides the electric power of the power source battery into small amounts, an amount of discharge electric power is limited. Thus, troubles which may be caused by overheating can be prevented, and a temperature sensor or a control circuit is unnecessary. Also, even if the capacity of the power battery is decreased, it only takes a longer charge time and a discharge output at one time is substantially constant so that the battery can be used economically. Moreover, the discharge characteristics of the capacitor are superior than those of a battery so that a required current can be discharged instantly.

The toy element causes, for example, drive, light emission, heat generation upon application of DC low voltage (0.5 V to 9.0 V) or thermal color change following said heat generation, and the like.

As the above-mentioned DC power source, a battery such as a dry battery, a solar battery, or the like, or a converted DC current by an AC adapter can be employed. The electric double layer capacitor is charged upon reception of a current from said DC power source, discharges a large current instantaneously, and functions effectively to operate the toy element 2 repeatedly without deteriorated even if the charging and discharging operations are repeated.

The energizing method or the energization-operated toy according to the present invention is mainly broken down into a system in which the electric double layer capacitor is applied in an isolated state as a simple substance and another system in which the electric double layer capacitor is interposed between the load and the power source.

In the system in which said electric double layer capacitor is applied in an isolated state, a protective member which consists of a plastic cylinder or the like houses the main portion of the capacitor in order to render handiness, safety and durability, and terminal portions 33 are provided to be connectable to electrodes of the load. There is further provided a short circuit preventing mechanism or the like for avoiding a short circuit caused by the terminal portions 33 contacting to a conductive material other than said electrodes 23. A plastic mold or the like which is made in the form of a toy in order to improve toy characteristics can be employed for the protective member 32 mentioned above. Further, the power source body 4 is arranged such that a battery 41 is set in a case 42. A mechanism 35 for preventing erroneous connection may be provided between said power source 41 and the electric double layer capacitor 31, or a light emission member 37 may be connected to the electric double layer capacitor 31 to be lighted up in its charged state or in the usable state.

On the other hand, in the system in which the electric double layer capacitor 31 is interposed on the route to the power source 41 in an assembled state, a switch 5 is interposed on the route to the load 21. It is arranged such that energization to the electric double layer capacitor 31 is kept in a turned-on state and the capacitor 31 is in a charged state, and energization to the load 21 is in a turned-off state in the normal mode, while the energization to said load 21 is in a turned-off state and the energization to said capacitor 31 is in a turned-off state in the operating mode, can be switched over reversely interlockingly with turned-on state, and these modes can be switched over reversibly. In this case, it may be arranged such that a plurality of loads 21 can be operated by a single electric double layer capacitor 31.

For the energization heat generation color changing toy 1, the thermal color changing material for forming the thermal color changing layer 22 which is disposed in contact with or close to the energization heating load 21 may be, for example, a thermal color changing material containing a conventionally known thermal color changing pigment, that is, a thermal color changing material containing three components including, for example, an electron donating coloring organic compound, an electron accepting compound and an organic compound medium for reversibly causing a color reaction of the above two compounds, or a thermal color changing material showing thermal color changing characteristics of said components in a form of fine particles of a resin solid solution (disclosed, for example, in the Japanese Patent Publication No. 51-35414, No. 51-44706, No. 1-29398, etc.). The above-mentioned compounds are color-changed at a temperature just above or below a predetermined temperature (color changing point), and exist only in specific one state out of the two states above and below the color changing point in a normal temperature range. That is, the other state is maintained only while the heat or cool heat required for appearance of said state is applied, but returns to the state appearing in the normal temperature range when said heat or cool head is stopped to be applied (that is, the compounds change color by indicating a small width of hysteresis concerning a temperature—color density depending on change in temperature).

There is also disclosed the thermal color changing layer 22 in the Japanese Patent Publication No. 4-17154, colored by a thermal color changing material which contains a color storing temperature sensitive color changing pigment color-changing with indicating a large hysteresis characteristics (that is, said material color-changes in largely different routes when the form of a curve plotted along changes in coloring density due to charges in the temperature shows that the temperature increases from a low temperature side from the color changing temperature range and when, reversely, it decreases from a high temperature side from the color changing temperature: the phase changed at a temperature not higher than the color changing point on said low temperature side or a temperature not lower than the color changing point on said high temperature side can be stored and maintained).

A non-thermal color changing layer 25 (a solid print, illustration, or the like by ordinary non-color-changing ink) may be properly disposed on a lower layer or an upper layer of said thermal color changing layer 22 so that a change in the phase caused by color change of the thermal color changing layer 22 can be visually recognized in more versatile forms.

A load for color-changing said thermal color changing layer 22, that is, the conductive resistant heating member 21, may be a heating circuit and the like made of a thin plate or a metallic thin wire made of iron, copper, copper alloy, brass, stainless steel, nichrome, nickel, titanium, tungsten, nickel-chromium alloy or other metallic material, or rope made of metallic thin wires twined together, conductive plastic material, copper foil, nickel-chromium alloy foil, aluminum foil or other metallic evaporated film, or a heating circuit and the like printed with various kinds of conductive ink. It is noted that as said metallic thin wire, one with the plated surface may be also effectively used.

A heating circuit made of said metallic foil, metallic thin film such as a metallic evaporated film is a conductive heating circuit provided on the surface of non-conductive support member 24. Said metallic thin film is made of a thin film having the thickness of 400 Å to 100 $\mu$m and an amount of heat generation per unit area in a normal temperature range in a range from $10 \times 10^{-3}$ W/cm$^2$ to 3 W/cm$^2$, which is selected from metals having a volume resistivity at a normal temperature in a range from $1.4 \times 10^{-6}$ $\Omega$ cm to $2.5 \times 10^{-5}$ $\Omega$ cm, and is arranged to be capable of thermally color changing the thermal color changing layer 22 upon application of voltage from 0.8 V to 15 V. A metal for forming the metallic thin film layer includes excellently conductive metallic materials such as copper, copper alloy, aluminum, nickel, zinc, tin, titan, gold, silver, etc., which has a volume resistivity in a range from $1.4 \times 10^{-6}$ $\Omega$ cm to $2.5 \times 10^{-5}$ $\Omega$ cm. These metallic materials are of comparatively low cost, and a system employing a thin film made of copper having a low resistivity is the most effective. More specifically, a system in which a desired heating circuit is disposed by etching a copper foil layer (normally having the thickness of 2 $\mu$m to 50 $\mu$m or around, and more preferably from 3 $\mu$m to 15 $\mu$m) formed on a substrate surface such as a plastic film, or the like satisfies practical requirements in terms of feasibility, conductivity, durability, heating performance, or the like, of said circuit.

The thickness range may be from 400 Å or around by metal evaporation to 100 $\mu$m or around by other metallic foil, depending on each purpose.

An amount of heat generation per unit area is from $10 \times 10^{-3}$ W/cm$^2$ to 3 W/cm$^2$, preferably from $50 \times 10^{-3}$ W/cm$^2$ to 2 W/cm$^2$, and more preferably from $200 \times 10^{-3}$ W/cm$^2$ to 1 W/cm$^2$. By setting an amount of heat generation in the preferable range mentioned above, the heating temperature is promptly increased to a desired one, and is maintained to be safe without any danger which may be caused by overheating, or the like.

In a system having an amount of heat generation of less than $10\times10^{-3}$ W/cm$^2$, the heat is not generated in a short period of time if the applied voltage is low. On the other hand, if an amount of heat generation exceeds 3 W/cm$^2$, the heat is generated to a high temperature instantaneously to be dangerous.

The applied voltage, if being less than 0.5 V, can hardly increase the temperature to change the color of the thermal color changing layer 22 to be visualized in the normal temperature range in a short period of time. On the other hand, if the applied voltage is not less than 15 V, it is not suited to be used in toys and the like. Normally, a voltage from a DC power source in a range from 1.0 V to 9 V, more preferably from 1.5 V to 6.0 V is applied.

On the upper layer of the above-mentioned conductive heating circuit, except in a special system, normally dispersed ink of non-color-changeable pigment or the like is printed with masking to form a non-color-changeable base layer for preventing visual recognition of said circuit. Then, a non-color-changeable image 25 is formed on said non-color-changeable base layer with non-thermal color changeable ink so as to form the thermal color changing layer 22 for preventing visual recognition of said non-color-changeable image at a normal temperature on the upper layer of said non-color-changeable layer 25. In this case, the conductive heating circuit is designed to form a pattern corresponding to the non-color-changeable image 25 so that the thermal color changing layer 22 is color-changed by heat generation to visualize the non-color-changeable image 25.

For the above-mentioned metallic wire, one which has the diameter of 0.015 mm to 1.5 mm can satisfy the required flexing performance, and is preferably used in terms of a temperature raising and a time therefore due to application of desired DC voltage. Also, as the above-mentioned metallic rope, at least two of metallic wires having the diameter of 0.015 mm to 0.5 mm are twisted together to form the rope having the outer diameter 0.03 mm to 1.5 mm.

The toy element 2 can be constituted by forming the thermal color changing layer 22 on the surface of the above-mentioned metallic wire or metallic rope. However, the toy element is normally formed by attaching to the wire or rope plastic sheet material or cloth formed with the thermal color changing layer 22 by the use of an adhesive or other attaching means. Specifically, dresses or decorations for dolls can be made by this method. In this case, if the surface of said wire material was coated with a hot-melt resin in advance and this processed member is employed, the above-mentioned attachment can be effected more satisfactorily.

The conductive resistant heating member made of said metallic wire or metallic rope is not only used for attachment to said sheet material, but can constitute the thermal color changing toy element 2 by being inserted into a central hole in the case of an imitation pearl or the like which is covered with the thermal color changing layer 22 on its spherical plastic surface.

DETAILED DESCRIPTION OF THE PREFERRED EMBODIMENTS

Figure 1:
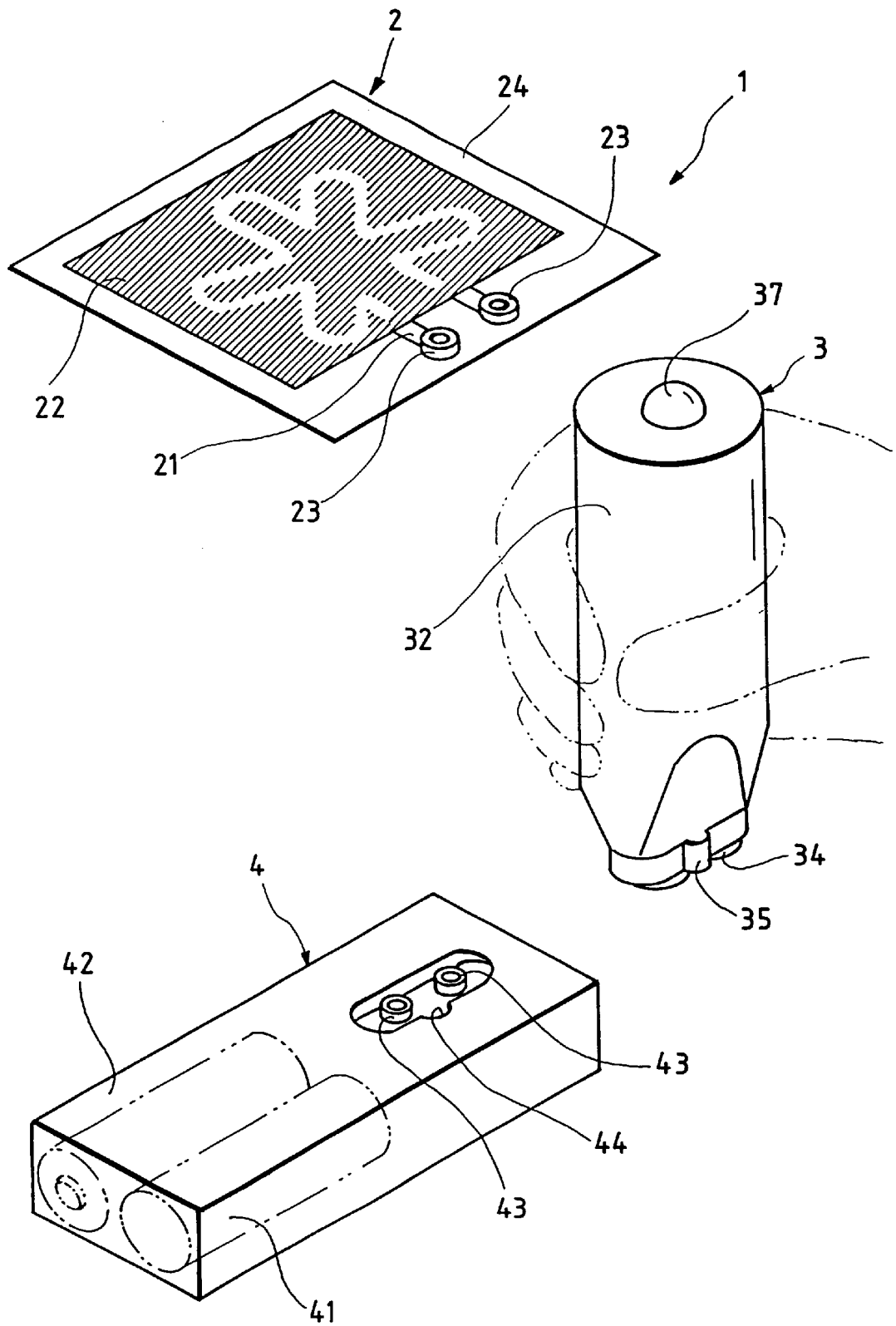
FIG. 1 is a view for explaining the external appearance of an energization heating color changing toy according to an embodiment of the present invention.
Figure 2:
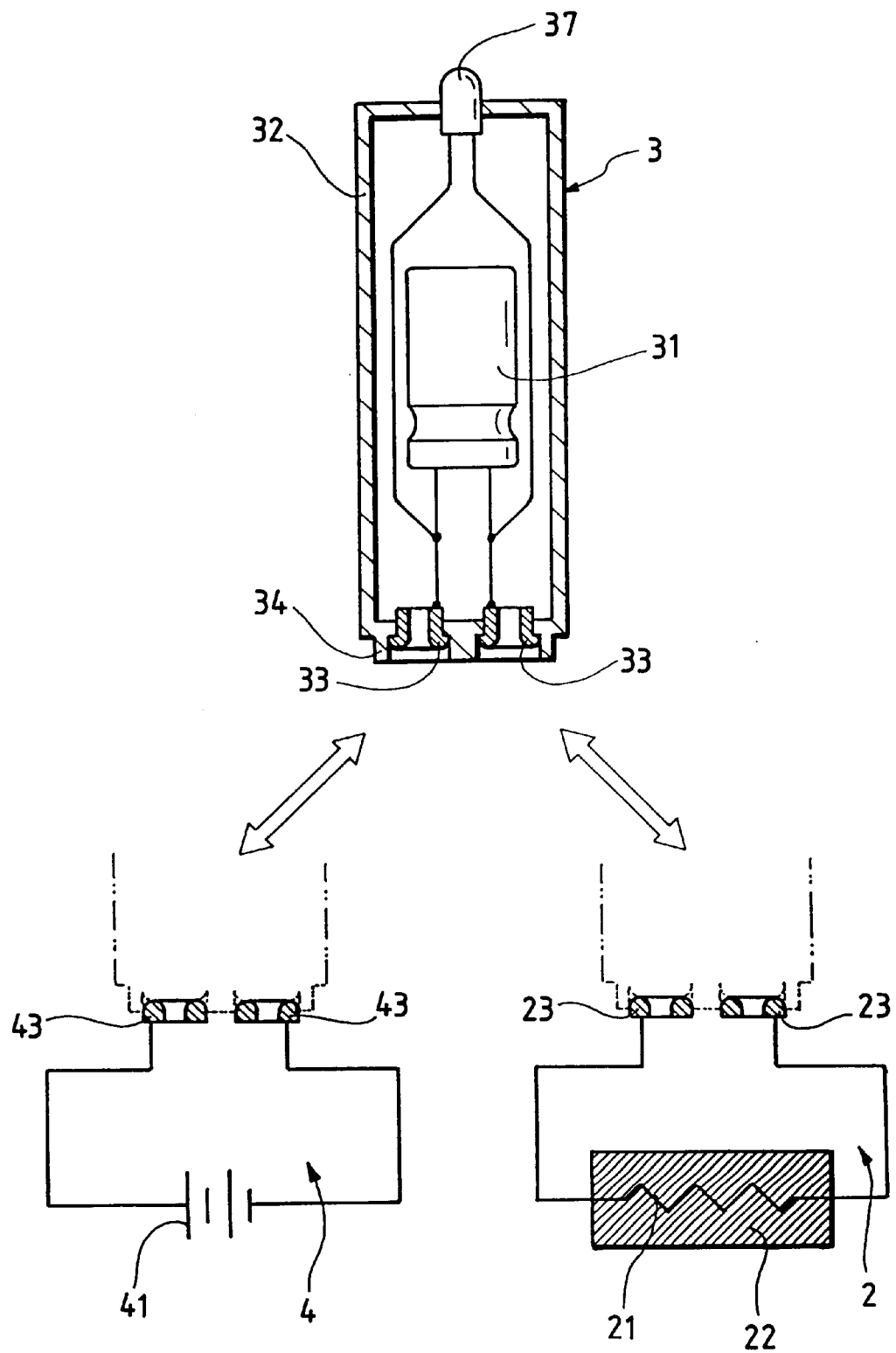
FIG. 2 is a view for explaining a relationship between a reception of a charge current from the power source by an energization means according to the present invention and a supply of a discharge current to energization heating load.
Figure 3:
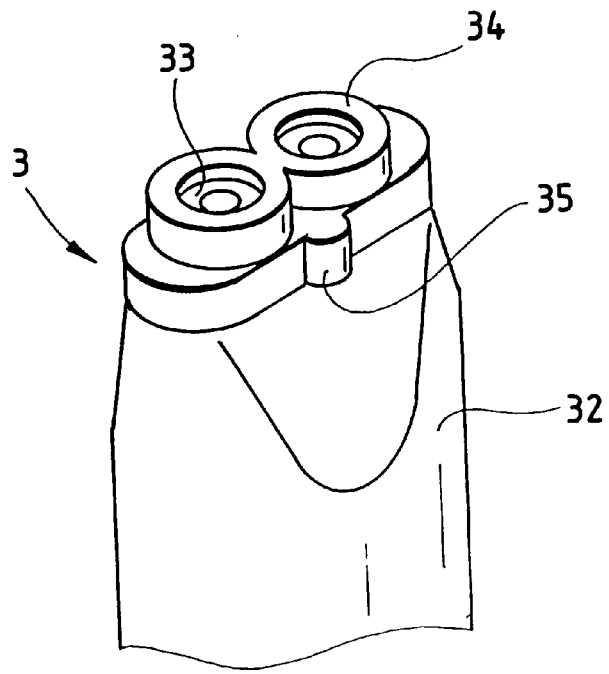
FIG. 3 is a view for explaining the external appearance of an essential portion of the energization means according to the embodiment.
Figure 4:
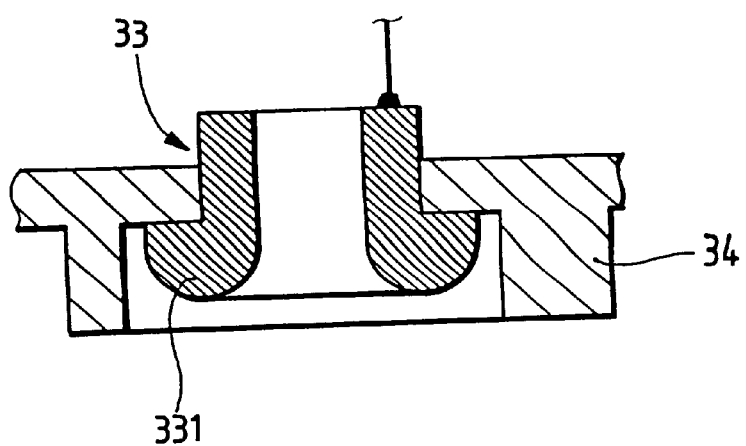
FIG. 4 is a view showing a longitudinal cross-section of a terminal portion of the energization means in an enlarged manner according to the embodiment.
Figure 5:
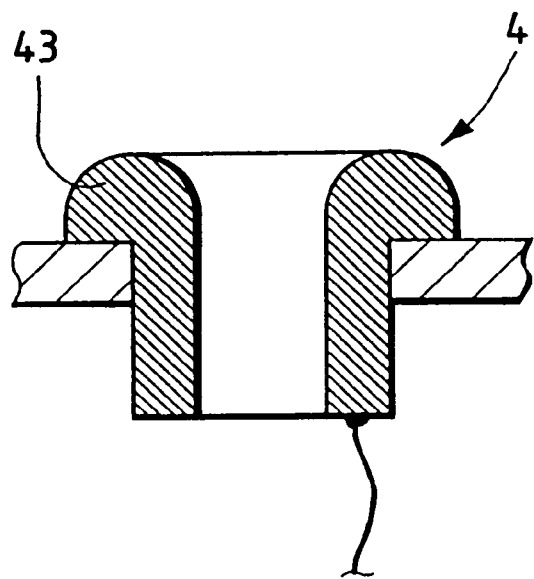
FIG. 5 is a cross-sectional view showing the essential portion of an electrode portion of the power source body in an enlarged manner according to the embodiment.
Figure 6:
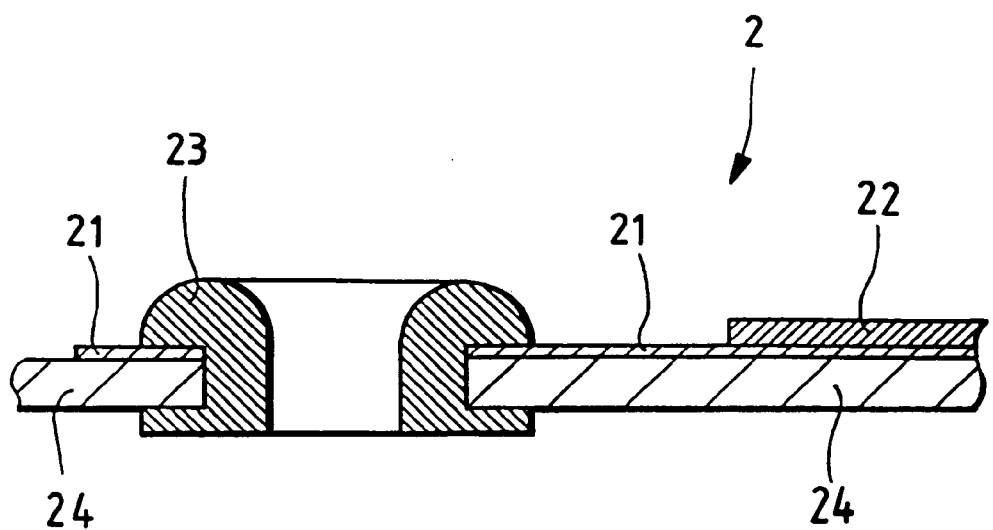
FIG. 6 is a longitudinal cross-sectional view for explaining the essential portion of the essential portion of the energization heating color changing element in an enlarged manner according to the embodiment.
Figure 7:
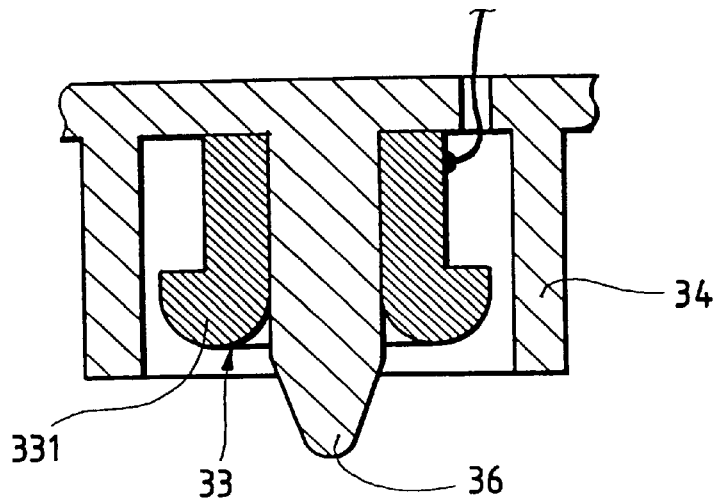
FIG. 7 is a longitudinal cross-sectional view for explaining the essential portion of the terminal portion of the energization means in an enlarged manner according to another embodiment.
Figure 8:
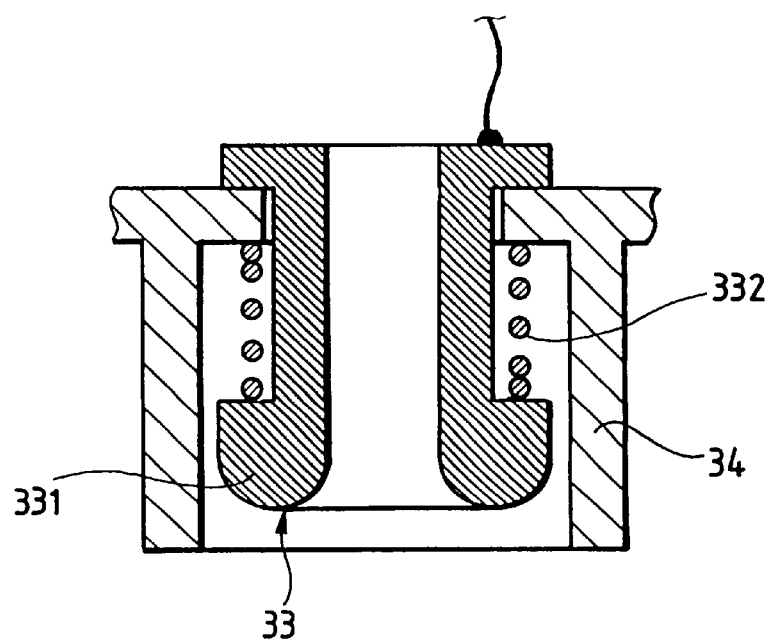
FIG. 8 is a longitudinal cross-sectional view for explaining the essential portion of the energization heating color changing element in an enlarged manner according to still another embodiment.

Embodiment 1 (with reference to FIG. 1 to FIG. 8)

As the electric double layer capacitor 31, one of Gold Capacitor AL series (made by Matsushita Electric Parts Co., Ltd., having cylindrical external appearance and having voltage proof against 2.5 V of a single cell, the electrostatic capacity of 3.3 F, the internal resistance 0.3 (Ω) at 1 KHz, the outer diameter of φ12.5×L 23.0 mm, and the diameter of the terminal of 0.8 mmφ) is used. Said capacitor 31 is housed in the protective member 32 made of plastic material, the both terminals 33 thereof are connected to a brass eyelet 331 to constitute the terminal portion 33. Said terminal portion 33 is positioned at the front opening end of said protective member 32 and is contained in the annular projection 34 for preventing a short circuit. In the axial direction in the vicinity of said opening end, there is provided a projecting streak 35 for preventing an erroneous connection with a power source body 4. At the rear end of said protective member 32, a part of a light emission diode 37 connected to said capacitor 31 is assembled in a projecting manner. Thus, the electrical energization means 3 is constituted. The above-mentioned light emission diode 37 is lighted up when being charged in order to visually confirm a state of the energization means 3.

The power source body 4 for supplying a charge power to said energization means accommodates two dry batteries of 1.5 V in a plastic case 42 thereof. Electrodes 43 (brass eyelets) of said dry batteries are positioned at an opening portion on the upper surface of the case 42. A cut-away portion 44 is provided on at said opening portion to be engaged with said projecting streak 35 so as to be detachably attached to said terminal portion 33 without erroneous connection.

The energization heating color changing element 2 is provided with a pattern which consists of heating tracks formed by copper foil on the surface of a sheet-shaped non-conductive support member 24 and the thermal color changing layer 22 which is formed on the upper layer of said heating track pattern with non-thermal color changeable masking and coating layer therebetween. (Said thermal color changing layer 22 develops its color at a temperature less than 35° C., and loses the color at a temperature not less than 35° C.). An electrode 23 (formed by connecting the brass eyelets) is provided at the end portion of said heating track.

When the terminal portion 33 of said energization means 3 is connected to the electrodes 43 of the power source body 4 and is charged for 10 seconds, and then said energization means 3 is isolated, and if the terminal portion 33 is connected to the electrode 23 of said energization heating color changing element 2 and energizes said element 2, the thermal color changing layer 22 which is in a colored state at a room temperature of 27° C. can be maintained in a colorless state and the temperature of the heating track is not raised more than 48° C.

For reference, if a current is applied to said heating track directly from a power source battery (3 V), a current of 1.07 A is measured, while in the energization means 1 by said electric double layer capacitor, an initial current of 1.37 A is measured, thus it being understood that a current required for the thermal color changing can be supplied instantaneously.

Since the current continues to flow for a long time in said direct application from the battery, the temperature of the heating track is raised to 80° C. or higher.

Figure 9:
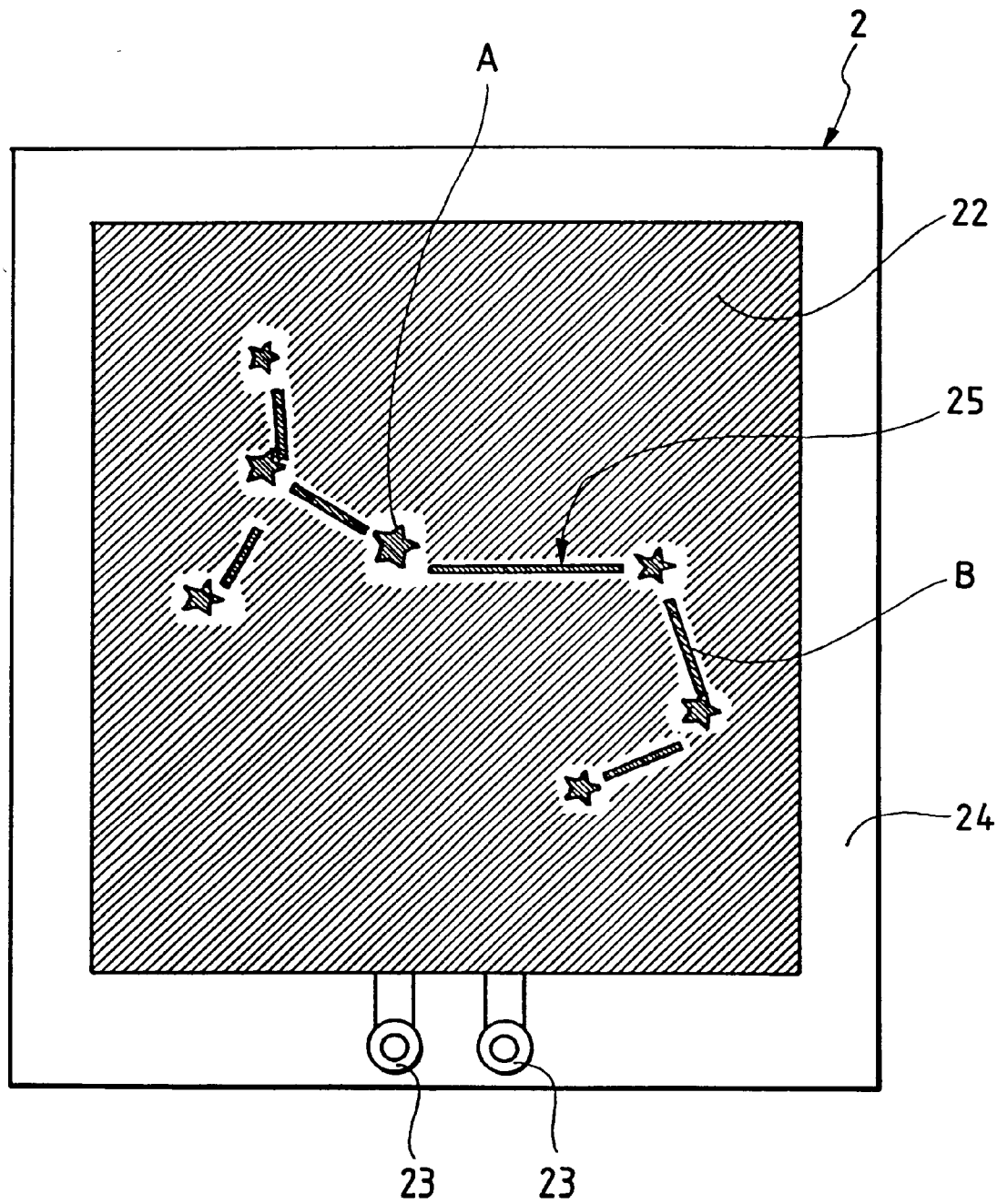
FIG. 9 is a view for showing another embodiment of the energization heating color changing element of the present invention and explaining a plane state in which the thermal color changing layer is color-changed by the heat generation upon energization to visualize a non-color-changing image.
Figure 10:
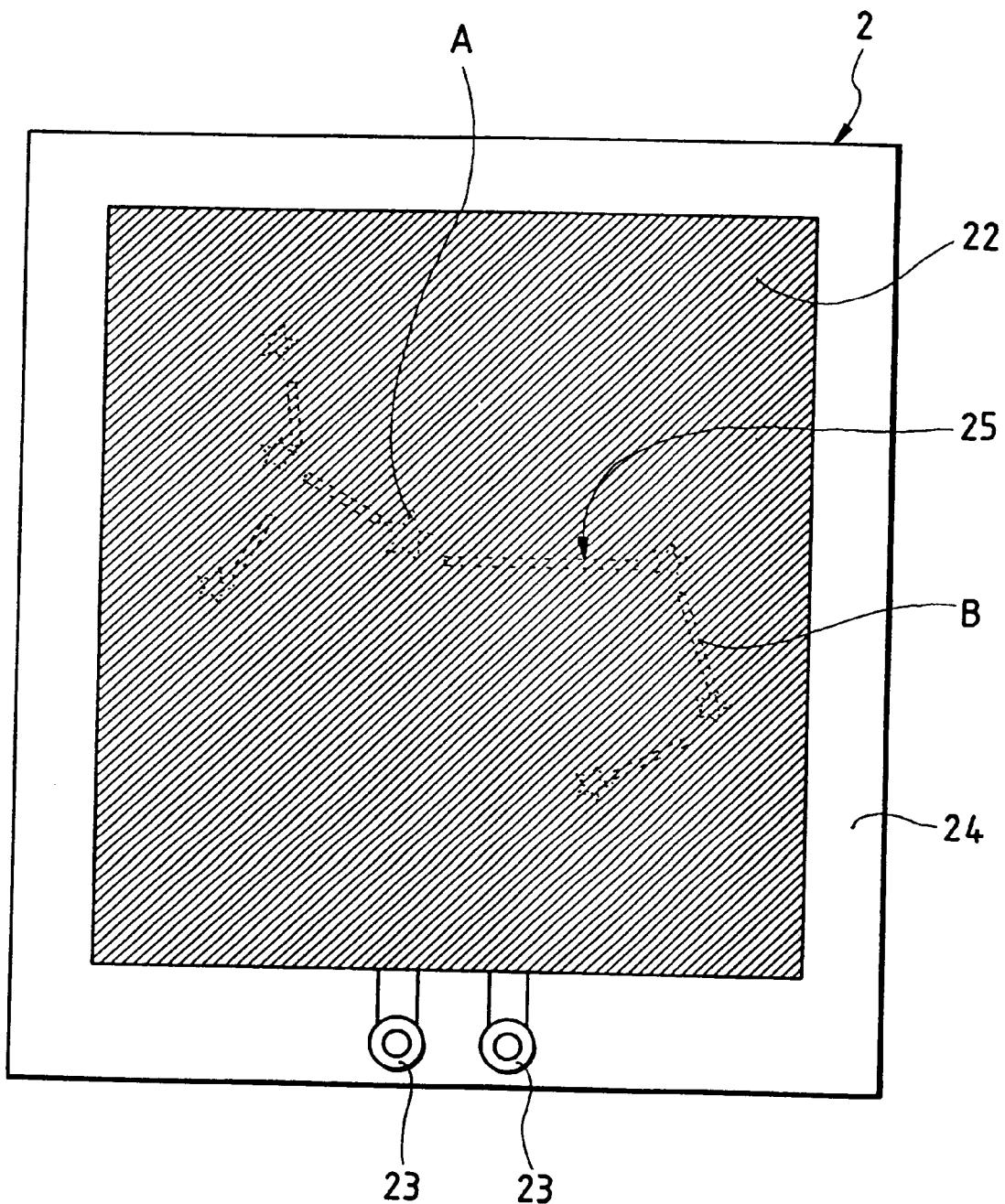
FIG. 10 is a view for explaining a plane state of the energization heating color changing element of FIG. 9 in a non-energized mode.
Figure 11:
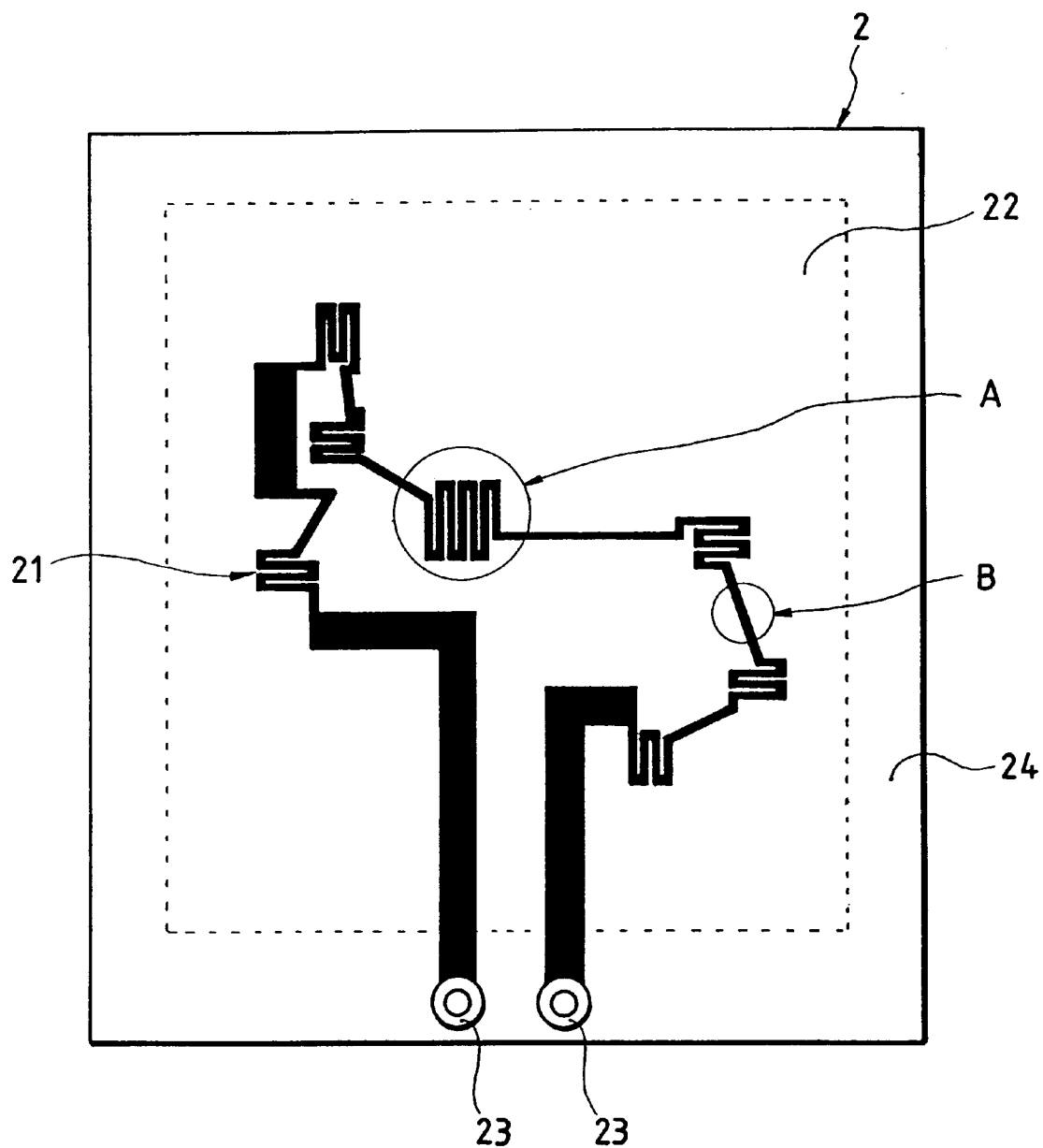
FIG. 11 is a view for explaining a conductive heating circuit of the energization heating color changing element of FIG. 9.

Embodiment 2 (With reference to FIG. 9 to FIG. 11)

FIG. 9 shows a state in which the thermal color changing layer 22 loses its color by heating upon energization and a non-color-changing image 25 (a constellation pattern) appears, while FIG. 10 shows a non-energized state in which said non-color-changeable image 25 is masked by the thermal color changing layer 22.

FIG. 11 shows a conductive heating circuit for bringing said constellation pattern into existence, in which the portion A is corresponding to a star and the portion B to a line for connecting stars.

The conductive heating circuit in the above description is a heating circuit having the width of 2 mm which is formed by etching a process film base member with copper-evaporated thin film having the thickness of 0.3 μm thereon formed on a PET film (polyethylene terephtalate film), and constitutes the electrode 23 with the both ends thereof having the width of 5 mm. (Normally, an annular conductive member is attached to said circuit in order to connect to the terminal portion 33 of the energization means 3 more easily.) Said energization heating circuit has the full length of 45 cm and an amount of heat generation per unit area of approximately 1.23 W/cm$^2$.

After a print layer with non-color-changeable white pigment ink is formed on the upper layer of said conductive heating circuit to mask said circuit, the non-color-changing image 25 (constellation pattern) is printed with non-color-changeable ink and said constellation pattern is subjected to a masking printing with reversible thermal color changeable ink (which is colorless at 30° C. or higher temperature, and black at a temperature less than 30° C.) so as to form the thermal color changing layer 22.

When DC voltage of 12 V is applied onto the energization heating color changing element 2 thus obtained, the thermal color changing layer 22 which is formed on the constellation pattern 25 becomes colorless so that the constellation pattern becomes visualized. When the above energization is released, the thermal color changing layer 22 becomes black again and the constellation pattern returns to be invisible.

In this case, depending on the characteristics that the electric double layer capacitor 31 is of low voltage and has a comparatively large capacity, rapid charging/discharging operations are performed and the electric double layer capacitor 31 functions as an energization heating means upon application of low voltage effectively.

Further, since the electric double layer capacitor 31 divides an amount of electricity of the power source battery into small units and stores them depending on the characteristics thereof, an over-current is not continuously discharged so that a trouble which may be caused by overheating can be avoided.

Embodiment 3 (not illustrated)

Three piano wires each having the diameter of 0.16 mm, and the full length of 20 cm were prepared. Metallic eyelet members were attached to the both ends of each piano wire to form the electrode 23, thereby constituting the energization resistant heating member 21.

Non-thermal color changing layers of a striped pattern having red, blue and yellow stripes were disposed at proper positions properly with proper spaces therebetween on the surface of a doll dress which was made of white cloth, and further on the upper surface thereof, the thermal color changing layer 22 which was colored to become black at a temperature less than 33° C. and became colorless at 33° C. or higher temperature was further provided. The above-mentioned energization resistant heating member 21 was boned to the back of the cloth on which each non-thermal color changing layer was positioned to constitute a thermal discolorable doll dress 2.

When the energization means 3 of the embodiment 1 was applied, in the doll dress which was black at a room temperature of 25° C., the thermal color changing layer 22 became colorless so as to visualize the striped pattern of red, blue and yellow stripes of the lower layer. Upon termination of the energization, the entire original surface returned to make the black dress.

Embodiment 4 (not illustrated)

A piano wire which had the wire diameter of 0.22 mm and the full length of 90 cm and was plated with copper was positioned at the central portion in the axial direction of a belt-like vinyl chloride sheet (coated with a pressure sensitive adhesive) having the width of 5 mm and the full length of 88 cm so that a belt-like vinyl chloride sheet having the same structure as that mentioned above was bonded in a face-to-face manner to cover said piano wire. Thus, the belt-like energization heating color changing element 2 was obtained.

A red non-thermal color changing layer is formed on said belt-like vinyl chloride sheet. And on the upper layer thereof, a thermal color changing layer 22 having the same configuration as that in the embodiment 3 is printed and formed.

When said energization heating color changing element 2 is flexed into the form of a petal of a tulip so as to constitute an artificial flower, and if this artificial flower is energized in the same manner, the petal can be changed from black into a petal of a red-striped pattern.

Embodiment 5 (With reference to FIG. 12 to FIG. 19)

Figure 12:
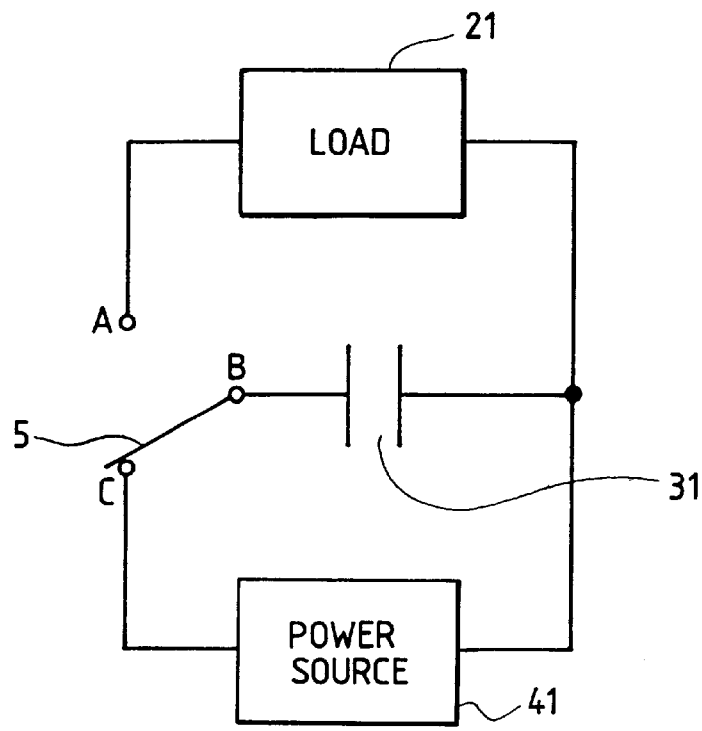
FIG. 12 is a diagram for explaining a circuit of a energization-operated toy according to the present invention.

FIG. 12 is a diagram for explaining a circuit structure according to the present invention. This circuit is comprised of a toy load 21 which is operated upon application of DC low voltage, a power source 41, an electric double layer capacitor 31 and a switch 5. Said capacitor 31 is charged upon reception of DC voltage from the power source 41 to supply a discharge current to the load 21. In this connection, said switch 5 is arranged such that a contact piece having the point B as its cardinal point can be switched to be contacted to a contact C on the power source side or a contact A on the load side so that its charging/discharging function mentioned above can be displayed effectively. The contact piece is held to be in a turned-on condition on the power source side (contacting to the contact C) in the normal mode, while it is set to be switchable to be in a turned-on condition on the load side (contact A) in the operating mode so that the load 21 can be smoothly operated upon discharging operation following the charging operation, and re-charge can be immediately allowed by switching after the discharge power is used up.

Figure 13:
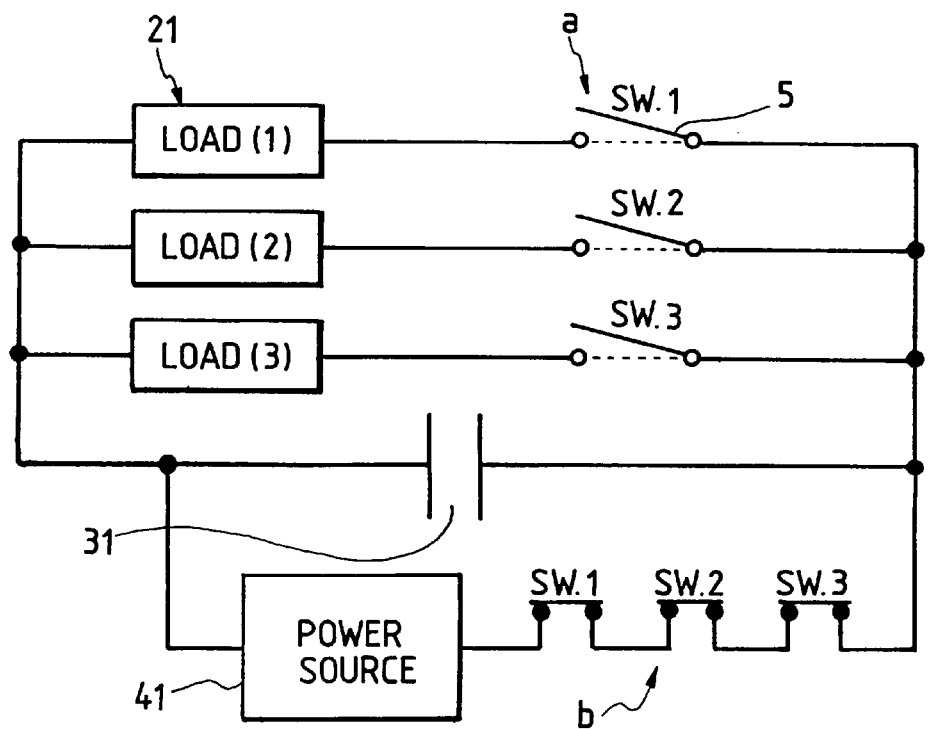
FIG. 13 is a diagram for explaining another circuit of the energization-operated toy according to the present invention.

FIG. 13 is a diagram for explaining a circuit in which a plurality of toy loads can be operated by a single electric double layer capacitor.

Switches (SW.1, SW.2, SW.3) are respectively connected to said three kinds of loads. These switches are of a type that switching to the contact a and that to the contact b are interlinked, whereby a charge from the power source 41 formed by the electric double layer capacitor 31 is interlinked with a discharge to the toy loads 21 to control the switching operation.

Figure 14:
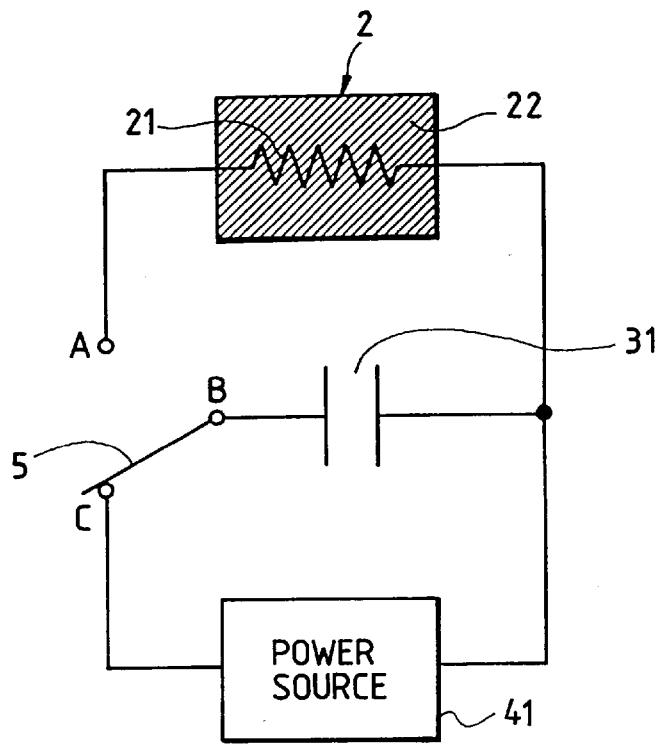
FIG. 14 is a diagram for explaining a thermal color changing element to which the circuit of FIG. 12 is applied.

FIG. 14 is a diagram for explaining a circuit in an embodiment to which the basic circuit structure in FIG. 12 is applied.

This diagram shows a specific example in which the thermal color changing layer 22 is color-changed by heat generated by the energization resistant heating member 21. In this example, a thermal color changing element 2 which consists of a reversible thermal color changing layer 22 (its point of color changing is 35° C.) disposed on the upper layer of said energization resistant heating member 21 (which is a heating circuit made of metallic foil, having a resistivity of 0.8 Ω, and the heating area of 1.5 cm$^2$) is attached to the circuit with an electric double layer capacitor 31 interposed between the thermal color charging element 2 and the power source 41 (which uses two dry batteries of 3.0 V and 1.5 V). This circuit is arranged to be charged or discharged freely by a switch 5. In this case, one of Gold Capacitor AL series (made by Matsushita Electric Parts Co., Ltd., having cylindrical external appearance, having voltage proof against 2.5 V of a single cell, the electrostatic capacity of 3.3 F, the internal resistance of 0.3 (Ω) at 1 KHz, the outer diameter of φ12.5×L23.0 mm, and the diameter of the terminal thereof of 0.8 mmφ) is used as the electric double capacitor 31. (Same electric double layer capacitor and power source are also employed in the subsequent embodiments).

Figure 15:
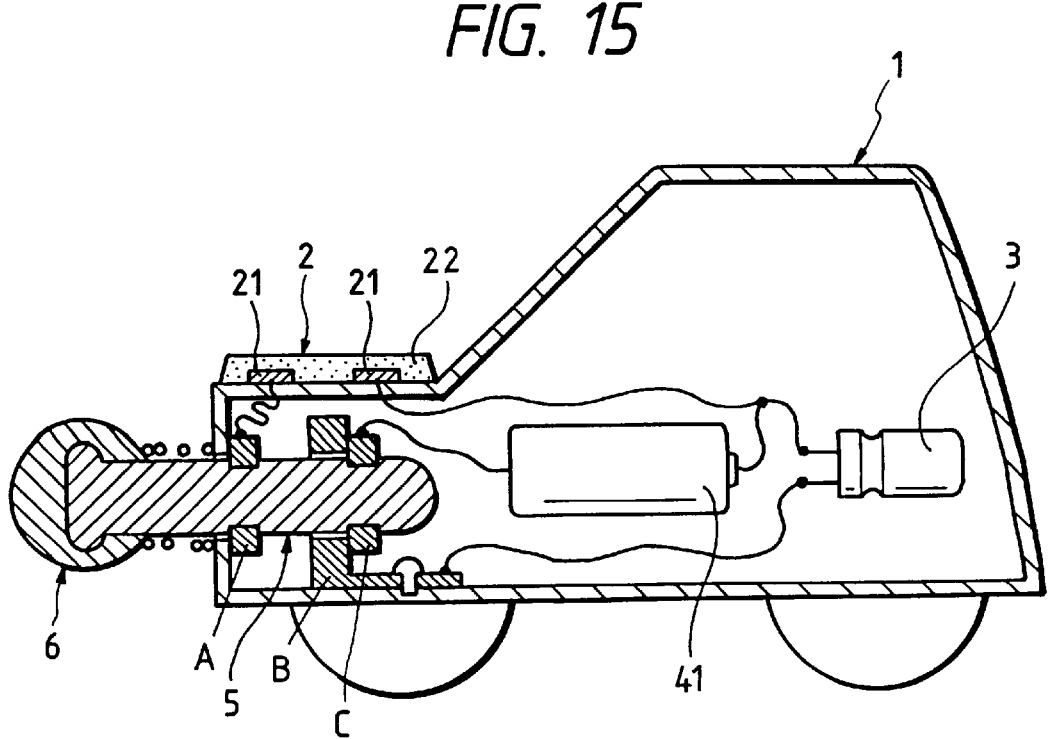
FIG. 15 is a view for longitudinally explaining the essential structure of a driving toy provided with the circuit of FIG. 14.

FIG. 15 is a view for longitudinally explaining an essential portion of a toy car 1 provided with the circuit in FIG. 14. In this car toy 1, there is provided a thermal color charging layer 22 which changes its color following heating upon energization on the surface of a plastic bonnet. An operator 6 of a bumper type which is projected from the front part of the body operates forward and backward to control a discharging/charging operations so as to cause said energization resistant heating member 21 to generate heat and to change color of the thermal color changing layer 22.

Said operator 6 is provided with a switching function, and is mounted on the body via a spring to be movable forward and backward in the axial direction. The operator 6 is arranged to be switchable in an interlinking manner to be in a turned-on state on the power source side in the normal mode, and to be in a turned-on state on the load side in the operating mode.

Figure 16:
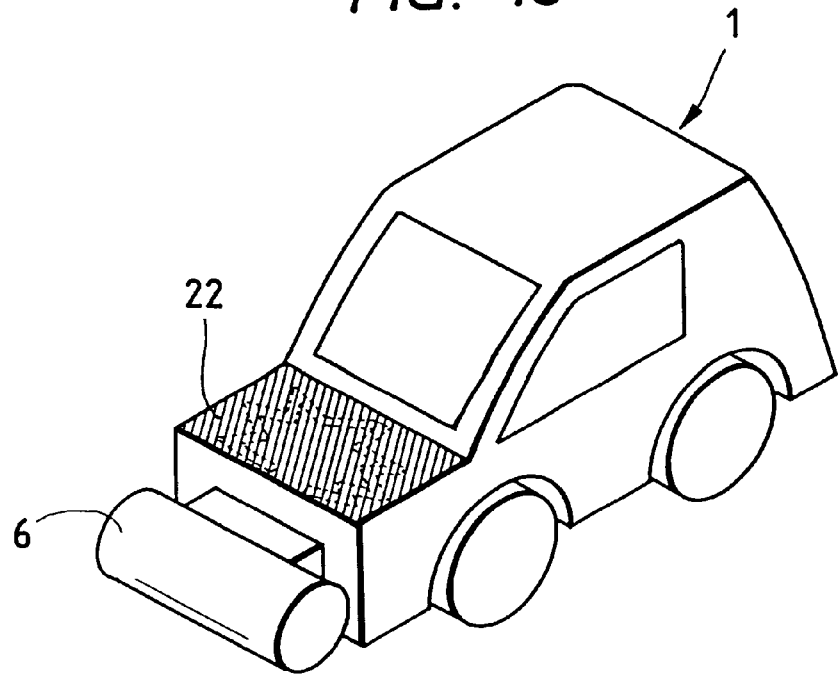
FIG. 16 is a perspective view for showing a state before the thermal color changing of the driving toy of FIG. 15.

FIG. 16 is a perspective view showing the car toy 1 in a condition before the thermal color changing is performed. The operator 6 is held in a turned-on state on the power source side and the electric double layer capacitor 31 is in a charged state.

Figure 17:
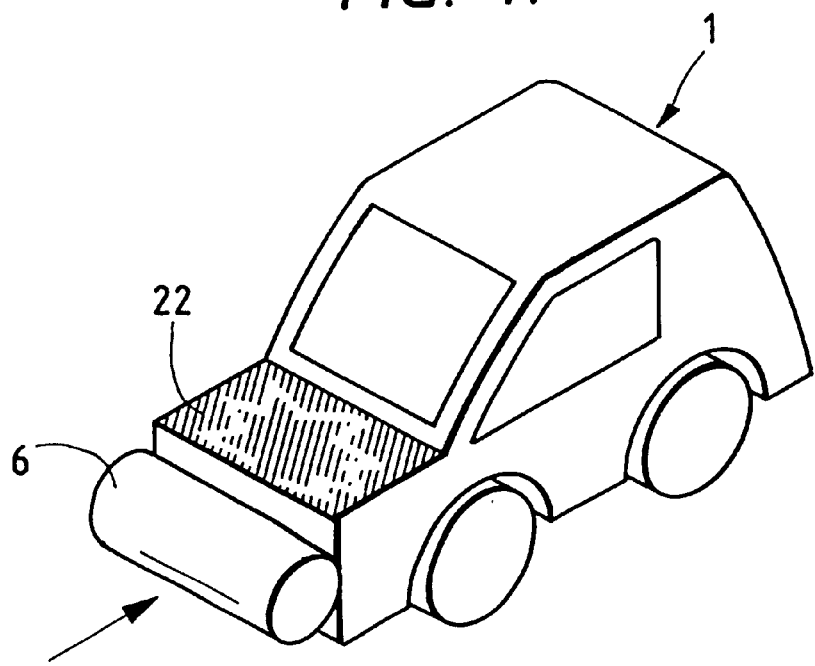
FIG. 17 is a perspective view for showing a thermally color-changed state of the car toy of FIG. 15.

FIG. 17 is a perspective view showing the car toy 1 of FIG. 16 in a state in which thermal color changing is being operated. In this state, the operator 6 is displaced backward by the pressure (e.g. impact) from the front part, the energization resistant heating member 21 is heated upon reception of the discharge power from the electric double layer capacitor 31, and the thermal color changing layer 22 changes its color.

Figure 18:
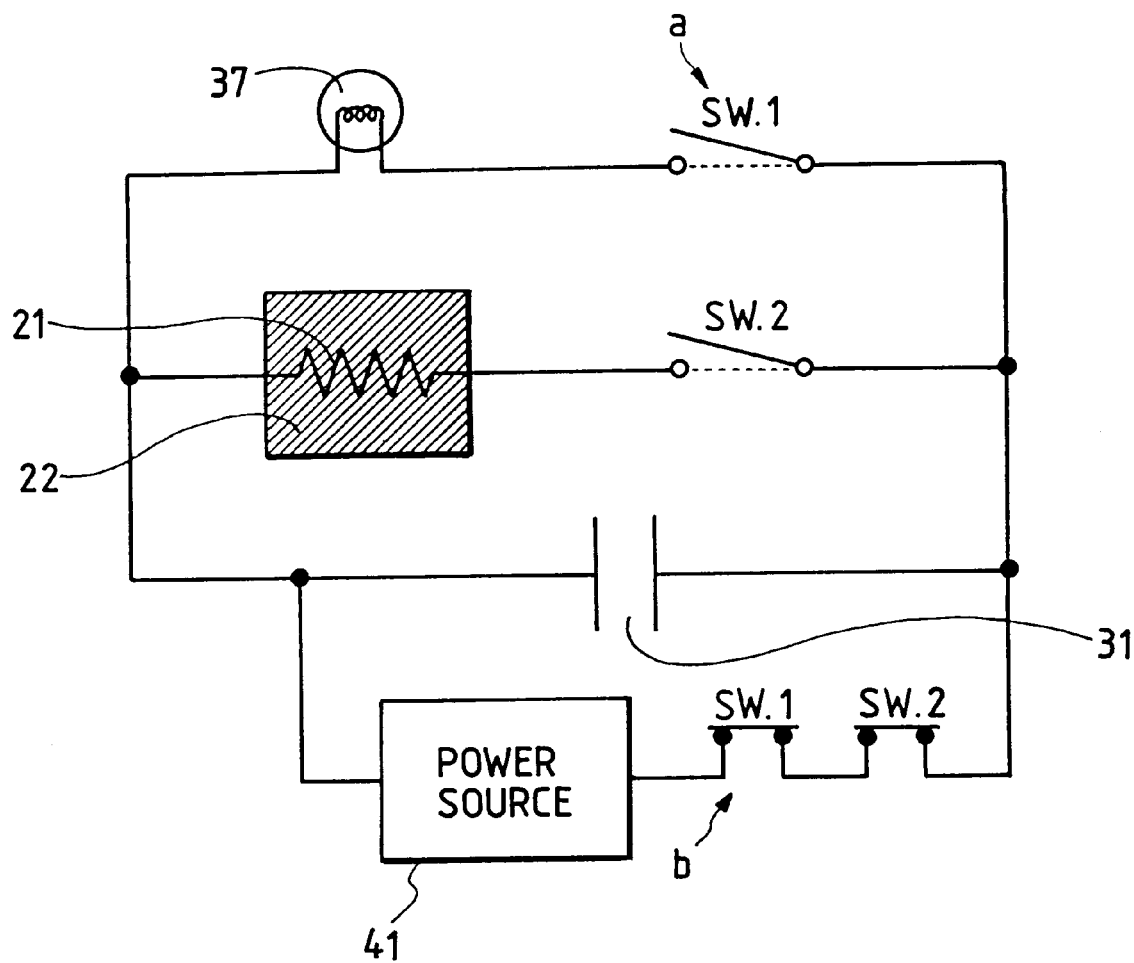
FIG. 18 is a diagram for explaining another circuit of the energization-operated toy according to the present invention.

FIG. 18 shows a specific example of the circuit which operates the plurality of loads (1), (2) and (3), as shown in FIG. 13. In this example, as the loads 21, there are provided members both for light emission and for energization heating color change. The switch SW.1 is connected to the light emission member 37 and the switch SW.2 is to the energization resistant heating member 21, respectively. Said switches are arranged such that the energization is freely switchable by connection with the contact a and the contact b so that the supply of a charge power from the power source 41 to the electric double layer capacitor 31 is alternately switched to the light emission member 37 or the energization resistant heating member 21 in an interlinking manner with the supply of a discharge power from said capacitor 31 to the light emission member 37 or the energization resistant heating member 21.

Figure 19:
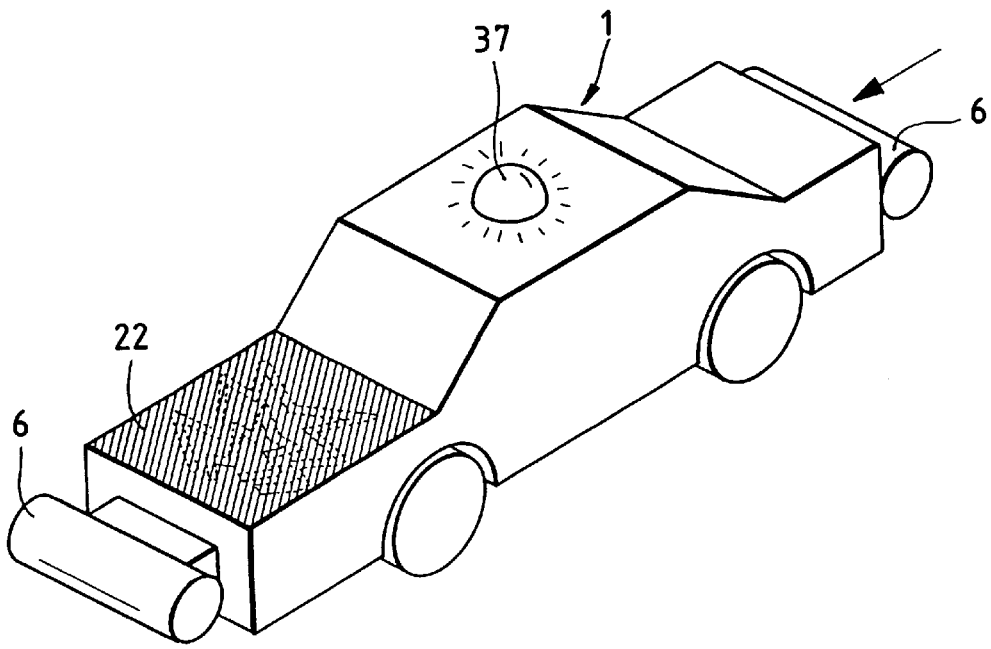
FIG. 19 is a perspective view for showing a light-emitted state of the car toy provided with the circuit of FIG. 18.

FIG. 19 illustrates the car toy 1 which is comprised of a plastic body provided with the circuit of FIG. 18. In this figure, the operator 6 (having a switching function with a similar arrangement described with reference to FIG. 15, by which charging and discharging operations by the electric double layer capacitor 31 are reversibly switched over upon forward or backward driving of the toy 1) is provided in front or in the rear of the body so that the switch SW.1 is displaced to be in a turned-on state on the light emission member 37 side upon a forward movement of the operator 6 in the rear of the body so as to light the light emission member 37.

Figure 20:
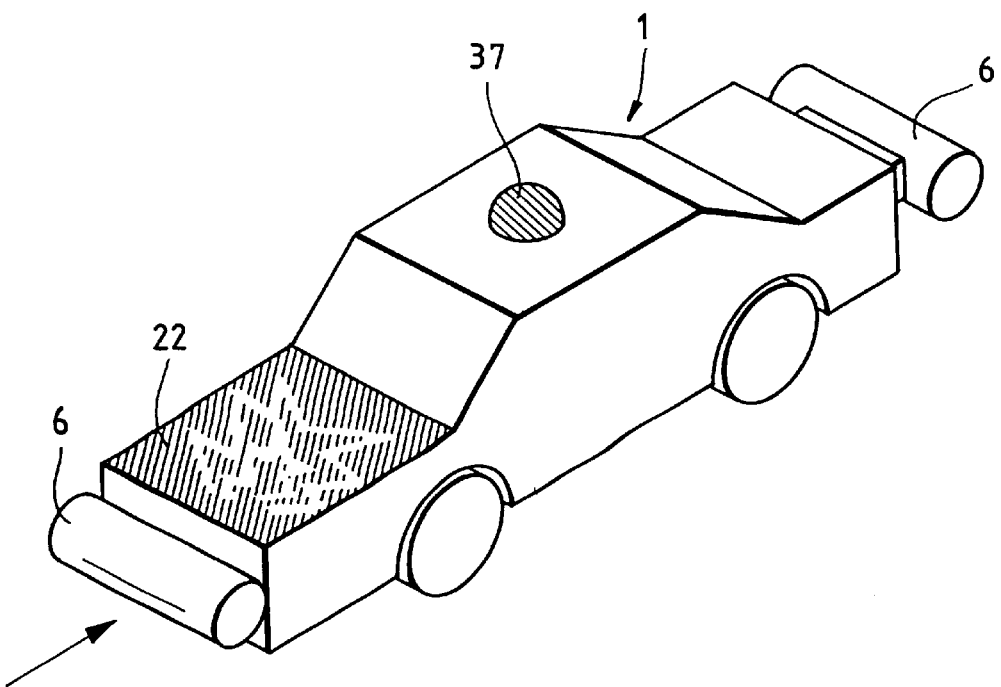
FIG. 20 is a perspective view for showing a thermally discolored state of the car toy provided with the circuit of FIG. 18.

FIG. 20 is a perspective view of the car toy for illustrating a state in which the switch SW.2 is switched into a turn-on state on the energization resistant heating member 21 side and the thermal color changing layer 22 is color changed by the heating upon energization.

By employing the electric double layer capacitor as the energization means for energizing the energization-operated toy element which is operated upon application of low voltage, it is possible to effectively display the characteristics of rapid charging/discharging operations.

In the system in which the above-mentioned electric double layer capacitor is isolated, after being connected to the power source and charged upon reception of a required current, and is employed as a simple substance, said electric double layer capacitor discharges the power to the operating element and, after the electric power was used up, the above-mentioned charge operation is repeated and the electric double layer capacitor can be used for the energizing operation by the repeated discharge operations, thereby improving convenience.

In the system in which the thermal color changing layer is color-changed upon heat generation of the resistant heating member, a proper electric current is instantaneously supplied to the resistant heating member to effectively change the color of the thermal color changing layer.

In this case, the electric double layer capacitor divides electric power of the power battery into small units to store, depending on the characteristics thereof so that an overcurrent is not continuously discharged to the energization heating member. As a result, any trouble due to an overheating is generated.

Further, since there are provided a short-circuit preventing mechanism, an erroneous connection preventing mechanism, a guide mechanism, a light emitting mechanism at the charging/discharging time and the like, even a child can handle the toy without any erroneous operation and can use it properly. The toy satisfies safety and practical requirements as well as its operating effects due to a low voltage. Thus, the present invention is effective for an energization operation toy, more specifically, an energization heating color changing toy.

Also, in the system in which the electric double layer capacitor is interposed between the power source and the load in an assembled manner, since the energization switch is also interposed, the energization to the electric double layer capacitor is kept in a turned-on state to be in a charged state and the energization to the toy loads is in a turned-off state in the normal mode, while the energization to said toy load is in a turned-on state and the energization to said capacitor is in a turned-off state in the operation mode. Said states are reversibly switchable in an interlinking manner so as to satisfy the toy characteristics.

What is claimed is:

1. An energization operated toy, comprising:

an energization heat generating color changing unit, a power source unit and an energization unit, said energization heat generating color changing unit, power source unit and energization unit being electrically separated from each other when they are not in use;

said energization heat generating color changing unit comprising (i) an energization resistant heat generating element selected from the group consisting of metallic foil, metallic wire, metallic rope and a printed image using conductive ink, (ii) a thermal color changing layer which is disposed in contact with or close to the energization resistant heat generating element, and (iii) a pair of first electric terminals, said pair of first electric terminals being electrically connected to said energization resistant heat generating element and being adapted to electrically connect to said energization unit;

said power source unit comprising (i) a case for receiving a power source for supplying a DC voltage from 0.5 V to 9 V, and (ii) a first connecting portion providing a pair of second electric terminals, said pair of second electric terminals being adapted to electrically connect said power source to said energization unit;

said energization unit comprising: (i) an electric double layer capacitor having a voltage-proof capability against at least 2 V and an electrostatic capacity from 0.22 F to 100 F, (ii) a hand-held type protective casing in which at least a main portion of said electric double layer capacitor is received, (iii) a second connecting portion providing a pair of third electric terminals, said pair of third electric terminals being adapted to electrically connect to said pair of first electric terminals and said pair of second electric terminals, wherein said pair of third electric terminals is adapted not to electrically connect to both of said pairs of first and second electric terminals simultaneously;

said pair of third electric terminals being electrically connected to said electric double layer capacitor, wherein said pair of third electric terminals are surrounded by a pair of generally annular projections provided at a portion of said protective casing separating each of said pair of third electric terminals in order to prevent a conductive element from inadvertently short-circuiting between the third electric terminals;

whereby, said energization heat generating color changing unit is functionally operated by electrically connecting said pair of third electric terminals of said energization unit to said pair of second electric terminals of said power source unit by engaging said second and first connecting portions, thereby electrically connecting said energization unit to said power source to charge said double layer capacitor;

disengaging said second connecting portion of said energization unit from the first connecting portion of said power source unit to electrically disconnect said power source from said double layer capacitor; and electrically connecting said pair of third electric terminals of said energization unit to the pair of first electric terminals of said energization heat generation color changing unit to discharge a current from said double layer capacitor to said energization heat generating color changing unit to generate heat and cause said thermal color changing layer to change color.

* * * * *

UNITED STATES PATENT AND TRADEMARK OFFICE
CERTIFICATE OF CORRECTION

PATENT NO.   :  5,932,992

DATED        :  August 3, 1999

INVENTOR(S)  :  TSUTOMU TOMATSU ET AL

It is certified that error appears in the above-identified patent and that said Letters Patent is hereby corrected as shown below:

ON THE TITLE PAGE:

[56] References Cited, under FOREIGN PATENT DOCUMENTS:

"07308461" should read --7-308461--.

COLUMN 1:

Line 41, "an" should be deleted;
   Line 43, "are" should read --is--; and
   Line 45, "energizing operation" should read
          --energization-operated--.

COLUMN 2:

Line 61, "deteriorated" should read --deterioration--.

COLUMN 3:

Line 58, "head" should read --heat--; and
         "to be" should read --being--; and
   Line 67, "with" should read --by--; and
         "a" should be deleted.

COLUMN 4:

Line 3, "charges" should read --changes--.

UNITED STATES PATENT AND TRADEMARK OFFICE
CERTIFICATE OF CORRECTION

PATENT NO. : 5,932,992
DATED : August 3, 1999
INVENTOR(S) : TSUTOMU TOMATSU ET AL It is certified that error appears in the above-identified patent and that said Letters Patent is hereby corrected as shown below:

COLUMN 6:

Line 8, "essential portion of the" (second occurrence) should be deleted;
    Line 31, "a" (second occurrence) should read --an--; and
    Line 67, "the" (second occurrence) should be deleted.

COLUMN 7:

Line 1, "both" should read --both of the--.

COLUMN 8:

Line 4, "the both" should read --both of the--;
    Line 37, "a" should be deleted; and
    Line 42, "the both" should read --both of the--.

COLUMN 9:

Line 44, "that" should be deleted.

COLUMN 10:

Line 2, "($\Omega$)" should read --$\Omega$--; and
    Line 15, "a" should be deleted.

COLUMN 11:

Line 52, "energization operated" should read --energization-operated--; and
    Line 59, "comprising" should read -- comprising:--.

UNITED STATES PATENT AND TRADEMARK OFFICE
CERTIFICATE OF CORRECTION

PATENT NO.   : 5,932,992

DATED        : August 3, 1999

INVENTOR(S)  : TSUTOMU TOMATSU ET AL

It is certified that error appears in the above-identified patent and that said Letters Patent is hereby corrected as shown below:

<u>COLUMN 12</u>:

Line 10, "comprising" should read --comprising:--;
    Line 22, "received," should read -received, and--; and
    Line 27, "is" should read --are--.

Signed and Sealed this

Tenth Day of April, 2001

Attest:

NICHOLAS P. GODICI

Attesting Officer

Acting Director of the United States Patent and Trademark Office